June 18, 1946.    L. W. BURCH    2,402,312
SNAP ACTING APPARATUS
Filed July 31, 1942    2 Sheets-Sheet 1
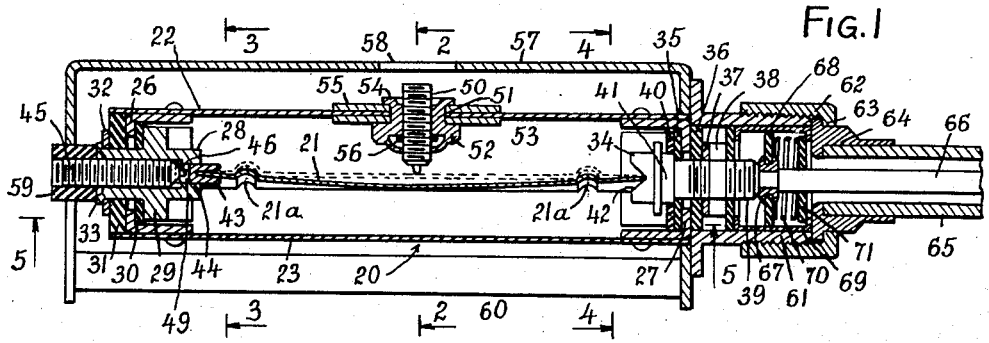
Fig. 1
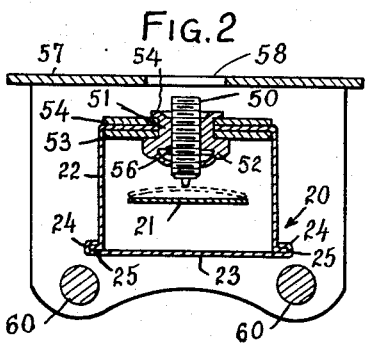
Fig. 2    Fig. 3    Fig. 4
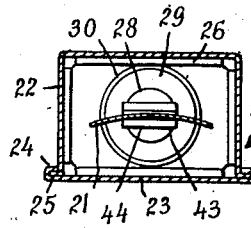
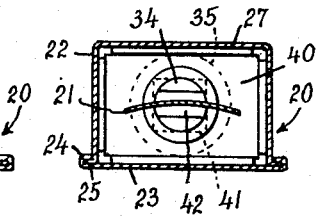
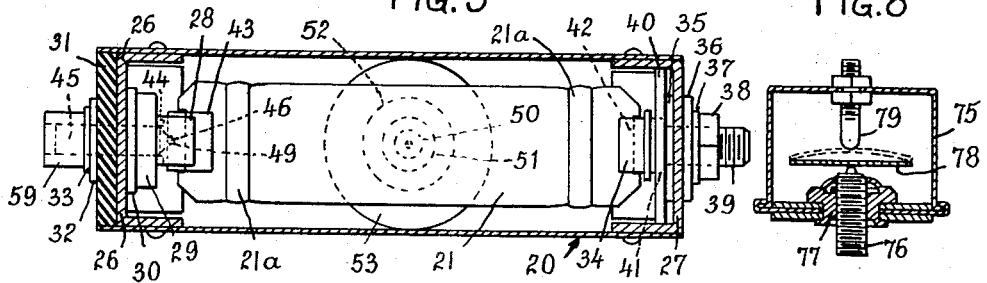
Fig. 5    Fig. 8
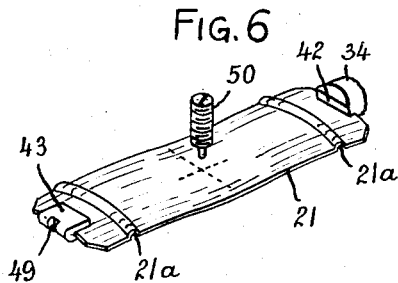
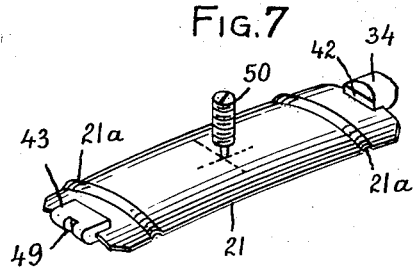
Fig. 6    Fig. 7
INVENTOR
LYNDON W. BURCH
BY
ATTORNEYS June 18, 1946.  L. W. BURCH  2,402,312
SNAP ACTING APPARATUS
Filed July 31, 1942  2 Sheets-Sheet 2

INVENTOR
LYNDON W. BURCH
BY
ATTORNEYS

Patented June 18, 1946

2,402,312

UNITED STATES PATENT OFFICE 2,402,312

SNAP-ACTING APPARATUS

Lyndon W. Burch, Bronxville, N. Y., assignor to The Wilcolator Company, Newark, N. J., a corporation of Delaware Application July 31, 1942, Serial No. 453,091

3 Claims. (Cl. 200—138)

This invention relates to a thermally responsive snap-acting device of improved construction which may be made to function either as a thermostat responsive to changes in the temperature of the atmosphere about the device, or as a fire detector which is not affected by ordinary temperature changes.

Various types of thermally responsive snap-acting devices have been proposed and used heretofore. For example, bimetallic elements have been configured so that with a sufficient change in temperature, the element abruptly snaps from one position to another. One such form of snap-acting thermostat device, for example, is made of a more or less circular bimetallic sheet shaped to the form of a shallow dish with a rounded bottom. When the bimetal component of higher coefficient of thermal expansion is on the concave side of the dish and its temperature is raised sufficiently, it expands and exerts a force tending to reverse the curvature of the dished element. This force is resisted mechanically by the dished configuration until the force of thermal expansion becomes large enough to overcome the opposing mechanical force. When this occurs, the dished element abruptly snaps to a reversely curved position in which the bimetallic component of higher coefficient of expansion is on the convexly curved side. Upon cooling the element, the forces are reversed and a snap action occurs in the opposite direction. This and other forms of snap-acting bimetallic devices have been employed to actuate contacts or other control mechanisms.

The above-described and other snap-acting devices of bimetallic construction are subject to a number of disadvantages. The cost of the element is necessarily considerable because of the expensive nature of bimetal. Calibration of such bimetallic devices is empirical, and the particular temperature at which snap action occurs will vary, even in devices of nominally the same construction, with variations in the bimetal itself. Moreover, bimetal devices are necessarily responsive to changes in the temperature of the ambient atmosphere. When used for fire detection, they are likely to give false alarms whenever the ambient temperature becomes high, unless they are set to respond only at a temperature substantially above the highest normal temperature ever likely to be encountered. If thus set, they may fail to give an alarm when a fire actually occurs, or to give it only after the fire has gained considerable headway.

In my United States Patent No. 2,253,552, granted August 26, 1941, I have described a form of thermally responsive snap-acting device in which the active snapper element is unimetallic. The snapper element of the device described in my aforementioned patent is permanently curved to the shape of a segment of a cylinder, and is held in such position so that upon being heated and caused to expand, it buckles abruptly. The change in position of the snapper that occurs when it buckles causes actuation of a contact or other control device.

Since the snapper element described in my aforesaid patent is unimetallic, it avoids many of the disadvantages of bimetallic devices. However, the snapper element and the contact it actuates generally must be exposed to the atmosphere, and may accumulate a coating of dirt or soot affecting its operation, and particularly the operation of the contact. Moreover, as described in my aforementioned patent, the snap-acting device is of such construction that it is necessarily responsive to ordinary slow temperature changes in the ambient atmosphere. Furthermore, it is not adapted for response to a sudden, rapid temperature change, independent of ordinary slow temperature fluctuations, and no such use was contemplated. Therefore, use of such a device as a fire detector is subject to substantially the same disadvantages as a bimetallic device.

The present invention provides improved thermally responsive snap-acting apparatus which may be constructed so as to function as a thermostat responsive to ambient temperature changes, or which may be constructed so as to be unresponsive to ordinary changes in the ambient temperature, but quickly responsive to a sudden large temperature change such as would be occasioned by the occurrence of a fire. The new apparatus therefore may be made to serve either as a thermostat, or as a reliable fire detector not affected by ordinary slowly occurring temperature changes.

The thermally responsive snap-acting apparatus of the invention comprises a thin sheet snapper element, and a snapper support. The snapper support is made of material having a coefficient of thermal expansion at least substantially as great as that of the snapper element. The snapper support shields the snapper element against a rapid rise in temperature. Means secured to the support are arranged to hold the snapper element under compression in a distorted position, whereby when the support is heated and so caused to expand sufficiently, the compressive force which holds the snapper distorted is released enough to enable the snapper abruptly to change its position.

The snapper support advantageously is in the form of a case substantially completely enclosing the snapper itself, and advantageously the support, like the snapper, is made of thin sheet material. Both the snapper and the case (or other support) may be metallic, in which case both are preferably of unimetallic construction.

The snapper advantageously is made of a springy metal (or other material) and is so formed that it tends to assume a longitudinally straight position with substantially all lateral cross-sections curved; in other words a longitudinally straight-laterally curved position, which is hereafter referred to as laterally curved, for convenience. The means by which the snapper is held in the case, or on such other support as is employed, may then be arranged to hold the snapper element under endwise compression with sufficient force so that at least the center section of the snapper is sprung to assume substantially a laterally straight position. Then when the case or other support is heated and so caused to expand to a sufficient extent relative to the snapper, the endwise compression on the snapper element is released and the center section returns with a snap action from its substantially laterally straight position to its laterally curved position.

The means by which the snapper element is held under compression preferably are made adjustable so as to permit adjustment of the extent to which the center section of the snapper element is laterally straightened under given temperature conditions, whereby the temperature conditions under which the snapper element snaps from one position to another may be adjusted.

If the snapper is curved laterally by forming it with a permanently set lateral curve, the holding means preferably engage only the midportions of the ends of the snapper element. These means also serve to locate the snapper at its proper position within the case or on such other support as is employed.

Contact elements (or other control devices, such, for example, as valves) may be positioned so as to be actuated whenever the snapper element snaps from one position to the other.

If the case or other support is made of metal or other material having a coefficient of expansion substantially greater than the coefficient of expansion of the material from which the snapper is formed, the device will function as a thermostat, for whenever such a device is heated (even by a slow increase in the ambient temperature) the case or other support will expand relatively more than the snapper, thus releasing the compressive force exerted on the snapper. On the other hand, if the coefficient of thermal expansion of both the snapper and the case are substantially the same, then the device does not respond to ordinary changes in the temperature of the ambient atmosphere, for such changes cause the case and the snapper to expand and contract together and to about the same extent. If, however, there is a sudden large temperature change in the ambient atmosphere, such as is caused when a fire suddenly occurs, the case is heated rapidly before the snapper element has an opportunity to become correspondingly heated. As a result, the case expands more rapidly than the snapper, releasing the compressive force exerted on the snapper and so enabling it to snap from its distorted position.

Devices of the character described are well suited for use in a fire detection system. Such a system may comprise flame-responsive apparatus comprising a case of thin sheet material positioned at a point of fire hazard, a snapper element formed of thin sheet material having substantially the same coefficient of thermal expansion as the material of the case, and means secured to the case arranged to hold the snapper element under compression in a distorted position from which it may snap, in the manner described above, when the case is rapidly heated as by a flame and so caused to expand relative to the snapper. Contact elements are arranged to be actuated by the abrupt change in position of the snapper when it snaps. A conductor connects one of the contacts to a source of current, and a second conductor connects the other of said contacts in series with an electrically operated fire-warning signal located at a point of observation remote from the point of fire hazard and with the source of current. A third conductor connects the second conductor adjacent its point of connection to the contact in series with a switch, a circuit-testing signal of high resistance relative to the fire-warning signal, and the contact-connected side of the current source.

When a fire occurs and rapidly heats the flame-responsive device, the case expands and thereby actuates the snapper, which in turn closes the contacts. A circuit is thereby closed through the current source and the fire-warning signal, causing the latter to give warning of the fire. The switch in series with the circuit-testing signal may be closed at any time to determine if the circuit from the current source through the fire-warning signal to the contacts is in proper operating condition. If it is, the circuit-testing signal will react to the flow of current when the switch is closed, but if it is not the circuit-testing signal will not react, indicating a defect requiring repair.

The invention will be better understood from the following detailed description of specific embodiments of the apparatus, considered in conjunction with the accompanying drawings, in which Fig. 1 is a longitudinal vertical section through apparatus embodying the invention;

Fig. 2 is a cross-section through the apparatus shown in Fig. 1, taken substantially along the line 2—2 of Fig. 1;

Fig. 3 is a cross-section taken substantially along the line 3—3 of Fig. 1;

Fig. 4 is a cross-section taken substantially along the line 4—4 of Fig. 1;

Fig. 5 is a horizontal section taken substantially along the line 5—5 of Fig. 1;

Fig. 6 is a perspective of the snapper element included in the apparatus of Figs. 1 to 5, shown in its distorted position;

Fig. 7 is a perspective similar to Fig. 6, but showing the snapper element in its normal position;

Fig. 8 is a cross-section similar to Fig. 2, but showing a modified arrangement of contact element;

Figure 9:
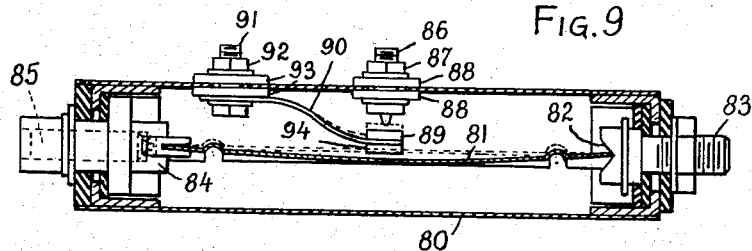
Fig. 9 is a longitudinal section similar to Fig. 1, but showing another modified arrangement of the contact elements.

Referring particularly to the apparatus shown in Figs. 1 to 7, the new snap-acting device comprises a case 20 of thin sheet material (preferably thin sheet metal) enclosing a thin sheet snapper element 21. The case is generally tubular in cross-section. As shown in Figs. 2 to 4, it is conveniently formed of a channel-shaped member 22 having it open side closed by a closure sheet 23, the edges 24 of the closure sheet being crimped over outwardly bent lips 25 at the extremities of the sides of the channel 22. Although this particular construction of the case 20 is inexpensive and otherwise satisfactory, it is understood that the case may be made in any other desired manner. For example, it may consist of a short section of thin-wall tubing, or it may be formed from sheet metal in any other appropriate manner.

Brackets 26 and 27 are welded, riveted or otherwise fastened to the interior of the case 20 at the ends thereof. A snapper support 28 is secured to the bracket 26 at one end of the case. The support 28 is generally cylindrical and is formed with a peripheral flange 29. A washer 30 of mica or other suitable insulating material is disposed between the flange 29 and the bracket 26. On the opposite side of the bracket 26 from the washer 30 is an end closure washer 31 of fiber or other insulating material, and bearing against the washer 31 is a metal reinforcing washer 32. The end 33 of the support 28 is peened outwardly over the reinforcing washer. Thus the supporting member 28 is firmly secured to the bracket 26 but is insulated therefrom by the washer 30 and the end closure 31.

At the opposite end of the case 20, a second snapper support 34 is secured to the bracket 27. As shown in Fig. 1, this support 34 is in the form of a bolt, the head of which is spaced from the bracket 27 by a washer 35 of mica or other insulating material. A second washer 36 of fibre or other insulating material is positioned on the opposite side of the bracket 27, and against it bears a metal reinforcing washer 37. A nut 38 on the threaded stem 39 of the bolt serves to clamp the latter to the bracket 27, from which it is insulated by the washers 35 and 36. A loosely fitting washer 40 of fibre or other insulating material having a squared central opening fits over a correspondingly squared section 41 on the head of the bolt-like support 34 to aid in centering the support with respect to the bracket and to prevent it from accidentally turning.

The snapper element 21 is held in position between the supporting members 28 and 34. The support 34 is formed with a V-shaped notch 42 which receives and supports one end of the snapper element 21. At the other end the snapper is provided with a block 43, which advantageously is formed by bending a small strip of metal over the end of the snapper at its midportion. The block 43 fits nicely in a slot 44 cut in the inner end of the support 28, and so serves to hold the end of the snapper in the support. An adjustment screw 45 threaded into the interior of the support 28 is provided for properly setting the position of the snapper 21 and placing it under compression. Advantageously, the end of the adjustment screw is formed with a reduced tip 46 engaging in a notch 49 (Figs. 6 and 7) formed at the bent edge of the block 43.

A contact screw 50 is mounted in the top of the case 20. The mounting means for the contact screw advantageously comprises an interiorly threaded eyelet 51 having a head 52 bearing against a metallic reinforcing washer 53 arranged interiorly of the case. The end 54 of the eyelet is peened out and over against a second metallic reinforcing washer 55 arranged exteriorly of the case. In this fashion the eyelet into which the contact screw is threaded is securely fastened to the case and makes electrical contact therewith. By turning the contact screw, the position of its lower contact end relative to the snapper may be adjusted. A horseshoe-shaped spring 56 may be provided to bear frictionally against the threads of the contact screw 50 and thus hold it in the position in which it is set.

The above-described assembly may be supported within a mounting bracket 57, which may also serve as a protective partial enclosure for the assembly. An opening 58 may be provided in the mounting bracket 57 to permit access to the contact screw 50, and a fibre or other insulating bushing 59 may be provided in the end of the bracket 57 to receive the snapper adjustment screw 45. Reinforcing rods 60 may extend the length of the bracket to impart rigidity to the structure and further to protect the case 20 and its enclosed snapper.

The contact screw 50, being in electrical contact with the case 20, serves as a grounded contact. The snapper 21, which is electrically insulated from the case and is adapted to make contact with the screw 50, serves as the ungrounded contact. Electrical connection with the snapper 21 may be made through the stem 39 of the snapper support 34. A convenient form of connection shown in Fig. 1 comprises a nipple 61 fastened to the bracket 57 and surrounding the projecting portion of the stem 39. The nipple is screw-threaded to engage with a union coupling 62 rotatably held by an inturned flange 63 to an end fitting 64 of a connecting cable 65. The conductor 66 within the cable terminates in a contact face 67 held by an insulating washer 68 centrally within a sleeve 69 forming a part of the end fitting 64. A coil spring 70 bearing against an insulating washer 71 at the base of the sleeve 69 urges the washer 68 and the contact 67 affixed thereto forwardly within the sleeve 69. The sleeve 69 fits within the nipple 61, wherein it is held when the union coupling 62 is screwed down on the nipple. The spring 70 then presses the contact face 67 at the end of the wire 66 into electrical contact with the threaded stem 39.

The above-described assembly for making contact with the bolt stem 39 is of more or less conventional construction and forms no part of the present invention. It is shown and described merely as a convenient means by which connection may be made to the bolt stem, but it is understood that any other means for making such connection may be employed.

The snapper element 21 is unimetallic, being formed from a thin sheet of any desired metal. The snapper is formed with a permanently set lateral curve, as shown in perspective in Fig. 7. The snapper normally tends to assume this laterally curved position, and is so mounted within the case 20 that when in this position it makes electrical contact, about at the point indicated by the dotted cross in Figs. 6 and 7, with the lower end of the contact screw 50. By means of the adjustment screw 45, the snapper within the case 20 may be placed under compression with sufficient force so that at least its center section is distorted by being sprung to assume substantially a laterally straight position, as indicated by the full lines in Figs. 1 and 2 as shown in perspective in Fig. 6. This distorted position of the snapper is herein referred to as its laterally straight position. When in the distorted or laterally straight position, the snapper element is out of contact with the contact screw 50. The change in position of the snapper from its laterally curved position (Fig. 7) to its laterally straight position (Fig. 6) occurs abruptly and with a snap action at a critical point when the compressive force exerted by the adjustment screw 50, reacting against the case 20, just overcomes the inherent longitudinal rigidity imparted to the snapper by its permanently set longitudinally straight-laterally curved position. Conversely, when the compressive force exerted by the adjustment screw 45 becomes just enough less than the internal forces tending to cause the distorted (laterally straight) snapper to return to its laterally curved position, the snapper returns to such permanently set curvature with an abrupt snap action. Thus the snapper may be caused to move abruptly to and from its position in contact with the contact screw 50.

To aid the snapper in holding its permanently set longitudinally straight-laterally curved position and to improve its snap action, curved transverse beads 21a may be formed adjacent the ends of the snapper. These beads reinforce the snapper at its ends by resisting any force tending to make the snapper flatten throughout its length and so lose its permanently set lateral curvature. Moreover, the beads are capable of flexing slightly when the snapper is placed under compression, whereas the laterally curved snapper elsewhere is inherently very rigid. Hence potential energy is stored in the slightly flexed beads when the snapper is under compression and is released as the snapper abruptly distorts to its laterally straight position. Consequently the snapper operates more smoothly as a result of the provision of the beads.

The metal or other material of which the snapper element 21 is formed should in all cases possess a coefficient of thermal expansion substantially no greater than the coefficient of expansion of the metal or other material of which the case 20 is formed. If the device is to be used as a thermostat responsive to changes in the temperature of the ambient atmosphere, then the case 20 should be made of a metal or other material having a coefficient of thermal expansion substantially higher than the coefficient of the snapper element. In such case, for example, the snapper element may be made of thin sheet "Invar," a metal which possesses a very low coefficient of thermal expansion, and the case 20 may be made of aluminum, brass, steel, or other thin sheet metal having a substantially higher coefficient of thermal expansion. If the device is to be employed for fire detection purposes, or for other puroposes where it should not be responsive to a normal change in the temperature of the ambient atmosphere, but only to a rapid and large temperature change, such as is occasioned by the occurrence of a fire, then the case is made of a metal having a coefficient of expansion substantially the same as that of the snapper. For such purposes both the snapper and the case may be made of the same metal, such, for example, as aluminum, brass, or steel. In either case the operation of the device is substantially as follows:

The adjustment screw 45 is adjusted at some suitable temperature to compress the snapper 21 and cause it to assume its distorted or laterally straight position (as indicated in Fig. 6). Then when the case becomes heated, the metal or other material of which it is constructed expands, thereby slightly increasing the length of the case and reducing the compressive force exerted through the adjustment screw 45 on the snapper 21. When the case has been heated sufficiently to reduce the compressive force exerted through the adjustment screw 45 below the critical value, the snapper abruptly returns to its laterally curved position. The snapper thereby moves from its position out of contact with the screw 50 into contact therewith. By suitable positioning of the adjustment screw 45, the precise temperature conditions under which the abrupt change in the position of the snapper occurs can be readily preselected. The more the adjustment screw compresses the snapper 21, the higher will be the temperature to which it is necessary to heat the case to release the compressive force exerted on the snapper and enable it to snap from its laterally straight position to its laterally curved position.

When the snapper is made of material having a substantially lower coefficient of expansion than the material of the case, the change in length of the case relative to the length of the snapper, and the corresponding change in the compressive force exerted on the snapper through the adjustment screw 45, occurs even with a slow change in the temperature of the ambient atmosphere. When the ambient temperature becomes high enough so that the case is expanded relatively more than the snapper to or beyond the point at which the critical compressive force is exerted on the snapper, the snapper abruptly snaps to its laterally curved position; and when the temperature of the ambient atmosphere falls to or below that at which the case becomes contracted to this critical extent, the compressive force exerted by the contracting case through the adjustment screw 45 overcomes the inherent rigidity of the laterally curved snapper, distorting it to the laterally straight position.

When both the snapper and the case are made of the same metal, or otherwise of materials having substantially the same coefficients of thermal expansion, an ordinary slowly occurring change in the temperature of the ambient atmosphere produces substantially no effect on the device, because the snapper and the case then expand or contract together and substantially to the same extent. If, however, the device becomes exposed to a flame or to other cause of a rapid and quite large temperature change, the case becomes heated more rapidly than the snapper. This is due to the fact that the case is directly exposed to the cause of the rapid change in temperature, whereas the snapper is shielded therefrom by the case. As a result the case expands relatively to the snapper, reducing the compressive force exerted on the snapper through the adjustment screw 45 and, at the critical point, enabling the snapper to move abruptly from its laterally straight position to its laterally curved position. The device in this form therefore is eminently suited for use as a fire detector which is not sensitive to ordinary temperature changes. The case of the device may be blackened to facilitate absorption of radiant heat and so increase its sensitivity as a flame detector.

The compressive force that must be exerted on the snapper to cause it to snap from its laterally curved to its laterally straight position is somewhat greater than the force necessary to hold it in the lateral position. Hence the critical temperature at which the case exerts the force required to distort the snapper is somewhat lower than the critical temperature at which the snapper is released from its distorted position. This "lag," however, is small in a properly made device.

If desired, the outer end of the adjustment screw may be secured to a hand-operated knob for convenient manual adjustment of the screw 45. In such a case the knob may carry a pointer for indicating on an adjacent scale the temperature conditions under which the snapper moves from one position to another.

Figure 10:
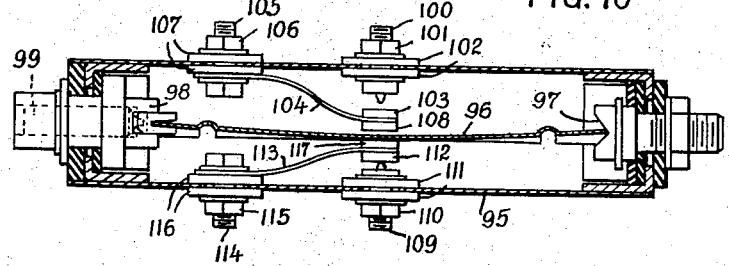
Fig. 10 is a longitudinal section similar to Fig. 9, showing still a further modification in the arrangement of the contact elements.

It is of course apparent that various other modifications also may be made in the snap-acting device particularly described above in connection with Figs. 1 to 7. A few of the possible modifications are shown in Figs. 8 to 10. Fig. 8 is a cross-section similar to Fig. 2 through a form of apparatus generally similar to that shown in Fig. 1, but provided with a contact which makes, rather than breaks, when the snapper is caused to change from its laterally curved position to its laterally straight position. The apparatus of Fig. 8 comprises a case 75 constructed similarly to the case 20 of the apparatus shown in Figs. 1 to 7. A contact screw 76 is mounted in a bushing or eyelet 77 secured to the bottom of the case 75 in substantially the same manner as the bushing 51 is secured to the top of the case 20 in the apparatus of Fig. 1. Within the case 75 is a snapper element 78 constructed and held in position in substantially the same manner as the snapper 21 of Fig. 1. The snapper 78 is formed with a permanently set lateral curve, and when undistorted assumes a position as indicated by the dotted lines in Fig. 8. When, however, the snapper is subjected to longitudinal compression, it is distorted so as to become laterally straight, in which case the midportion of the snapper element is bent down to the position indicated by the full lines in Fig. 8, in which position it makes contact with the contact screw 76. Thus the apparatus shown in Fig. 8 causes a contact to be made between the snapper 78 and the contact screw 76 when the snapper is under compression sufficiently to be distorted to its laterally straight position. This contact is broken when the compression on the snapper is released sufficiently for it to return to its laterally curved position.

If desired, an adjustable pin 79 of insulating material may be fastened to the top of the case 75 to bear against the midportion of the snapper. By adjusting the force with which the pin 79 bears against the snapper when in its laterally curved position, it is possible to vary (within limits) the compressive force required to cause the snapper to snap to its laterally straight position, and so to vary somewhat the sensitivity of the snapper to temperature changes. The more strongly the pin 79 bears against the laterally curved snapper, the less is the endwise compressive force required to snap it to its laterally straight position.

In many cases it is objectionable to employ either the snapper element or the case as an electric current carrying member. Where the currents involved are small control currents, apparatus such as shown in Figs. 1 to 8, in which the case or the snapper, or both, are arranged as current carrying members, may be employed successfully. If the currents are of substantial magnitude, however, neither the case nor the snapper should be current-carrying elements of the circuit. The passage of a substantial current through either of these parts causes it to become heated electrically and hence independently of the ambient temperature. Such independent heating of either the snapper or the case will of course affect the precision with which the device operates. If the currents involved are fairly large, therefore, it is better practice to employ a modification such as is shown in Fig. 9, in which both the case and the snapper are insulated from the current-carrying members.

The apparatus shown in Fig. 9 is in general of the same construction as the apparatus shown in Figs. 1 to 8. It comprises a case 80 of thin sheet metal, in which is supported a snapper 81 which may be formed with a permanently set lateral curve, as described above with reference to Figs. 6 and 7. The snapper is held at one end in the notched head 82 of a bolt 83, and at the other end by a supporting member 84, into which is threaded an adjustment screw 85. The supporting structure may be constructed substantially as described above in connection with Fig. 1, except that no provision need be made for making electrical connection with the snapper.

An adjustable contact screw 86 is threaded into an eyelet 87 clamped to the top of the case 80, but electrically insulated therefrom by insulating washers 88.

A second contact element 89 is supported on a springy conducting arm 90 directly below the end of the contact screw 86. The arm 90 is mechanically secured to the case 80 by a bolt 91 and nut 92, but is electrically insulated from the case by insulating washers 93. A block 94 of insulating material is secured to the arm 90 directly below the contact member 89 in position to be engaged and pressed upwardly by the snapper when the latter is in its laterally curved position. With the snapper in such position, the contact element 89 is thrust into electrical contact with the lower end of the contact screw 86, as shown in dotted lines in Fig. 9. When the snapper 81 is placed under sufficient compression to be distorted to its laterally straight position the central portion of the snapper moves in a direction away from the block 94 and the contact element 89 is brought down and out of contact with the screw 86 by the natural resilience of the contact carrying arm 90, substantially to the position shown in full lines in Fig. 9. In using the apparatus shown in Fig. 9, electrical connections are made to the bolt 91 and to the contact screw 86 so that no current need flow at any time through either the case 80 or the snapper 81.

In some cases it may be desired to arrange the apparatus for actuating contacts when the snapper is in either its laterally curved position or in its laterally straight or distorted position. Apparatus whereby this result may be achieved is shown in Fig. 10. Here again the apparatus comprises a case 95 in which is mounted a snapper 96. The snapper is supported at one end in the notched head of a bolt 97, and at the other end by a supporting member 98. An adjustment screw 99 in the supporting member 98 is provided to exert the proper compressive force on the snapper 96.

A contact screw 100 is threaded into an eyelet 101 clamped to the top of the case 95 but insulated therefrom by insulating washers 102. Immediately below the contact screw 100 is a contact 103 carried on a resilient supporting arm 104. This supporting arm is fastened by a bolt 105 and nut 106 to the top of the case 95, but is insulated therefrom by insulating washers 107. A block 108 is secured to the arm 104 below the contact 103 in position to be engaged and pressed up by the snapper when the latter is in its laterally curved position, so as to press the contact element 103 into electrical contact with the screw 100.

A second similar set of contacts located on the underside of the snapper 96 comprises a contact screw 109 threaded into an eyelet 110 clamped to the bottom of the case 95, but insulated therefrom by washers 111. Directly over the contact screw 109 is a contact member 112 carried on a resilient arm 113, which in turn is clamped by a bolt 114 and nut 115 to the case 95, but from which it is insulated by washers 116. A block 117 of insulating material is fastened to the arm 113 directly opposite the contact member 112. The insulating block 117 is in position to be engaged by the snapper when the latter is under compression and distorted to its laterally straight position. When the snapper is in such position, it presses on the block 117, forcing the contact member 112 into electrical contact with the contact screw 109.

The apparatus shown in Fig. 10 is such that when the snapper is in its laterally curved or undistorted position, contact is made between the upper contact screw 100 and its mating contact element 103, and when the snapper is in its laterally curved or distorted position, the upper contact is broken and a contact is established between the lower contact screw 109 and its corresponding contact element 112.

Although the lower contact assembly of the apparatus shown in Fig. 10, like the apparatus shown in Fig. 8, has been particularly described as being arranged to be closed whenever the snapper is distorted to its laterally straight position, it is understood that the lower contacts may be spaced sufficiently far below the snapper element so as to be closed only when the snapper becomes laterally straight to some extent greater than the minimum possible lateral curvature. In such case the snapper may, when it is laterally straight but only to a slight extent, assume a neutral position in which it effects closure of neither the upper nor the lower contacts. When thus constructed the device may serve to indicate a cold condition as well as a hot condition.

Figure 11:
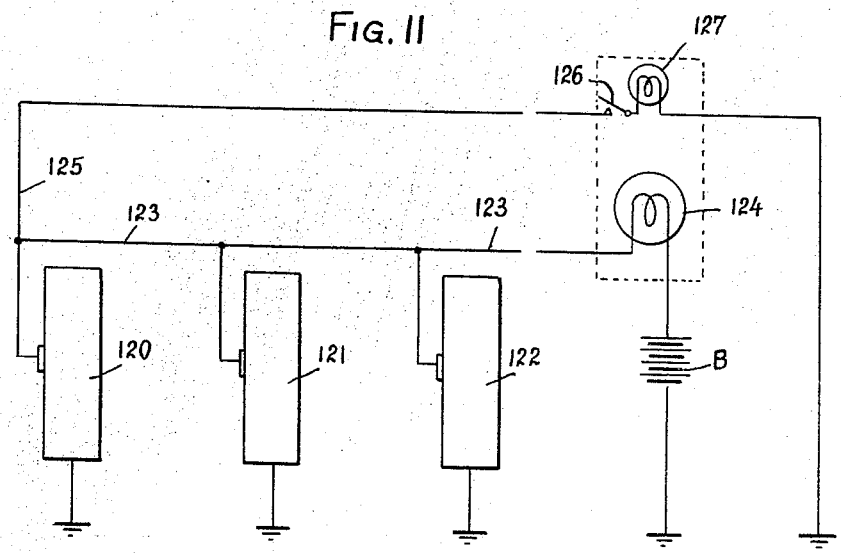
Fig. 11 is a diagram of a wiring circuit suitable for a fire detection system employing the apparatus of the invention.

The combination of apparatus constructed as described above in a fire alarm wiring circuit is shown diagrammatically in Fig. 11. In this combination, a plurality of snap-acting devices 120, 121, and 122 are mounted at strategic points where a fire hazard exists. Each of these devices advantageously is constructed as described above in connection with Figs. 1 to 7, and of materials such that both the snapper and the case have substantially the same coefficient of thermal expansion. One of the contacts of each snap-acting device is grounded as indicated. The other contact of each device is connected through a conductor 123 in series with a warning signal such as a lamp 124 and a current source such as a battery B. One terminal of the battery is grounded to complete the warning-signal circuit.

The extremity of the conductor 123 most remote from the warning lamp 124 is connected by a conductor 125 in series with a switch 126 and circuit testing signal such as a lamp 127 to ground. The warning signal 124, the switch 126, and the circuit-testing signal 127 may be mounted on a control panel at some convenient observation point.

As each of the devices 120, 121, and 122 comprises a case and a snapper possessing substantially the same coefficient of thermal expansion, and are adjusted so that the contacts controlled thereby will be normally open, the circuit through the warning signal 124 is normally interrupted. When a fire occurs and the flame heats the case of one or more of the devices 120, 121, and 122, sufficiently to enable its snapper to close its contact, the circuit through the warning-signal lamp 124 becomes completed and the lamp glows, indicating the occurrence of a fire to which the observer can give his prompt attention. When the fire has been extinguished and the case of the heated snap-acting device has cooled sufficiently, the contact controlled thereby is again opened and the warning lamp 124 goes out, whereupon the apparatus is again in condition for indicating the occurrence of a subsequent fire.

The switch 126 and circuit-testing signal 127 are provided for the purpose of testing the wiring circuit between the warning-signal lamp and the snap-acting devices to make sure that this circuit is in proper working condition. The circuit-testing signal 127 preferably is a lamp of high resistance relative to the warning signal lamp 124. Hence, when the switch 126 is closed, a circuit is completed through the battery, the low resistance warning signal lamp, the conductors 123 and 125, and the high resistance circuit testing lamp. The circuit-testing lamp thereupon glows, indicating that the circuit in which it is connected is in operating condition. If there is any failure in the conductor 123, the warning-signal lamp 124, or the current source B which would render the fire warning circuit inoperative, the circuit testing lamp 127 does not light when the switch 126 is closed, thus indicating the existence of the circuit failure and the necessity for remedying it. It is of course apparent that the only conductors of substantial length in which a failure would be likely to occur are the conductors 123 and 125. All other connections may be made very short, and hence not likely to develop failures.

The above-described fire detection system is well suited for use in military tanks, in which case the observation panel containing the lamps 124 and 127 and the switch 126 may be mounted on or near the tank operator's instrument panel, and the snap-acting devices may be located at strategic points in the tank engine compartment or other location where fire hazard exists. It is especially important in the case of tanks powered with gasoline engines that the operator be promptly warned of the occurrence of a fire because of the rapidity with which gasoline engine fires may gain headway. In modern tanks, especially in tanks of the larger sizes during participation in military operations, a fire can be started and can attain proportions beyond control without the knowledge of the tank crew, unless a fire detection system such as is described above is employed. It is understood, however, that the above-described fire detection system is not confined in its utility to military tanks, but may be used in ships, airplanes, warehouses, and other places where a fire detection system is of advantage.

A particular advantage of the snap-acting apparatus herein described is that the case, which forms an actuating part of the device and is the part that must be heated or cooled to operate the snapper, may completely enclose the more sensitive snapper and the contact elements, thus protecting them from dust and other detrimental accumulations. The device may remain in remote and dirty places literally for years without being rendered inoperative by dust, grease, or other accumulations, but will always be ready for service. The snapper and the case both may be made of very thin metal so as to be readily and rapidly heated to the temperature of the surrounding atmosphere. In addition, the device is simple and of rugged design so that it will easily withstand rough usage.

I claim:

1. Thermally responsive snap-acting apparatus comprising a thin sheet snapper element of springy material so formed as to tend to assume a laterally curved position, a case of thin sheet material having a coefficient of thermal expansion at least substantially as great as that of said snapper element, and means secured to said case arranged to hold the snapper element under endwise compression with sufficient force so that said element is sprung at least at its center section to assume substantially a laterally straight position, and a contact member positioned so as to be engaged by the snapper element when the latter is in its laterally curved position.

2. Thermally responsive snap-acting apparatus comprising a thin sheet snapper element of springy material so formed as to tend to assume a laterally curved position, a case of thin sheet material having a coefficient of thermal expansion at least substantially as great as that of said snapper element, and means secured to said case arranged to hold the snapper element under endwise compression with sufficient force so that said element is sprung at least at its center section to assume substantially a laterally straight position, a contact member positioned so as to be engaged by the snapper element when the latter is in its laterally curved position, and a second contact member positioned so as to be engaged by the snapper element when the latter is straightened laterally to a predetermined extent.

3. Thermally responsive snap-acting apparatus comprising a thin sheet snapper element of springy material so formed as to tend to assume a laterally curved position, a case of thin sheet material having a coefficient of thermal expansion at least substantially as great as that of said snapper element, and means secured to said case arranged to hold the snapper element under endwise compression with sufficient force so that said element is sprung at least at its center section to assume substantially a laterally straight position, and a contact member positioned so as to be engaged by the snapper element when the latter is straight laterally to a predetermined extent.

LYNDON W. BURCH.